United States Patent [19]

Willette

[11] 4,417,096
[45] * Nov. 22, 1983

[54] METHOD FOR SPLICING A FLAT CONDUCTOR CABLE ENCLOSED WITHIN A SEALED ENVELOPE

[75] Inventor: Albert D. Willette, Pfafftown, N.C.

[73] Assignee: AMP Incorporated, Harrisburg, Pa.

[*] Notice: The portion of the term of this patent subsequent to Mar. 9, 1999 has been disclaimed.

[21] Appl. No.: 282,111

[22] Filed: Jul. 10, 1981

Related U.S. Application Data

[63] Continuation-in-part of Ser. No. 228,644, Jan. 26, 1981, Pat. No. 4,319,075.

[51] Int. Cl.³ ............................................. H01R 43/00
[52] U.S. Cl. .................................... 174/71 R; 29/868; 174/88 R; 174/117 FF
[58] Field of Search ........... 174/88 R, 117 FF, 117 F, 174/117 A, 71 R, 72 R; 29/868, 872

[56] References Cited

U.S. PATENT DOCUMENTS

| | | | |
|---|---|---|---|
| 2,749,382 | 6/1956 | Lockard | 174/117 FF X |
| 4,249,304 | 2/1981 | Weinmann et al. | 29/872 |
| 4,263,474 | 4/1981 | Tennant | 174/84 C |
| 4,319,075 | 3/1982 | Willette | 174/71 R X |

Primary Examiner—A. T. Grimley
Assistant Examiner—D. A. Tone
Attorney, Agent, or Firm—G. K. Kita; R. W. J. Usher

[57] ABSTRACT

A method for routing a Flat Conductor Cable Assembly (1) in which a cable (10) includes conductors (12)(14)(16) contained in a sheath (18) and the sheath is enclosed within a sealed envelope (2)(4), in which the envelope is entered and the cable routed along an angle turn or spliced to another like cable, and the envelope is resealed.

6 Claims, 8 Drawing Figures

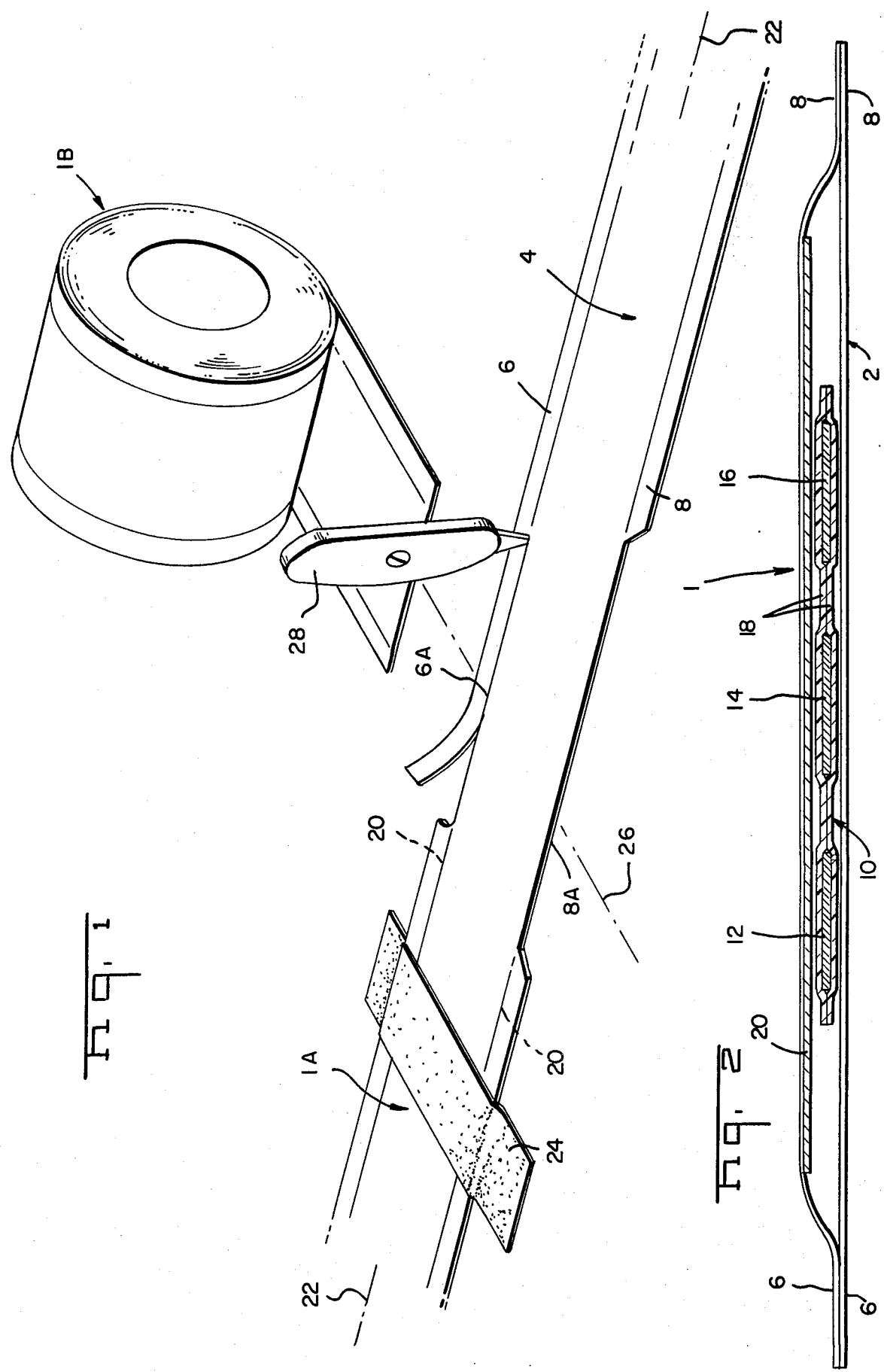

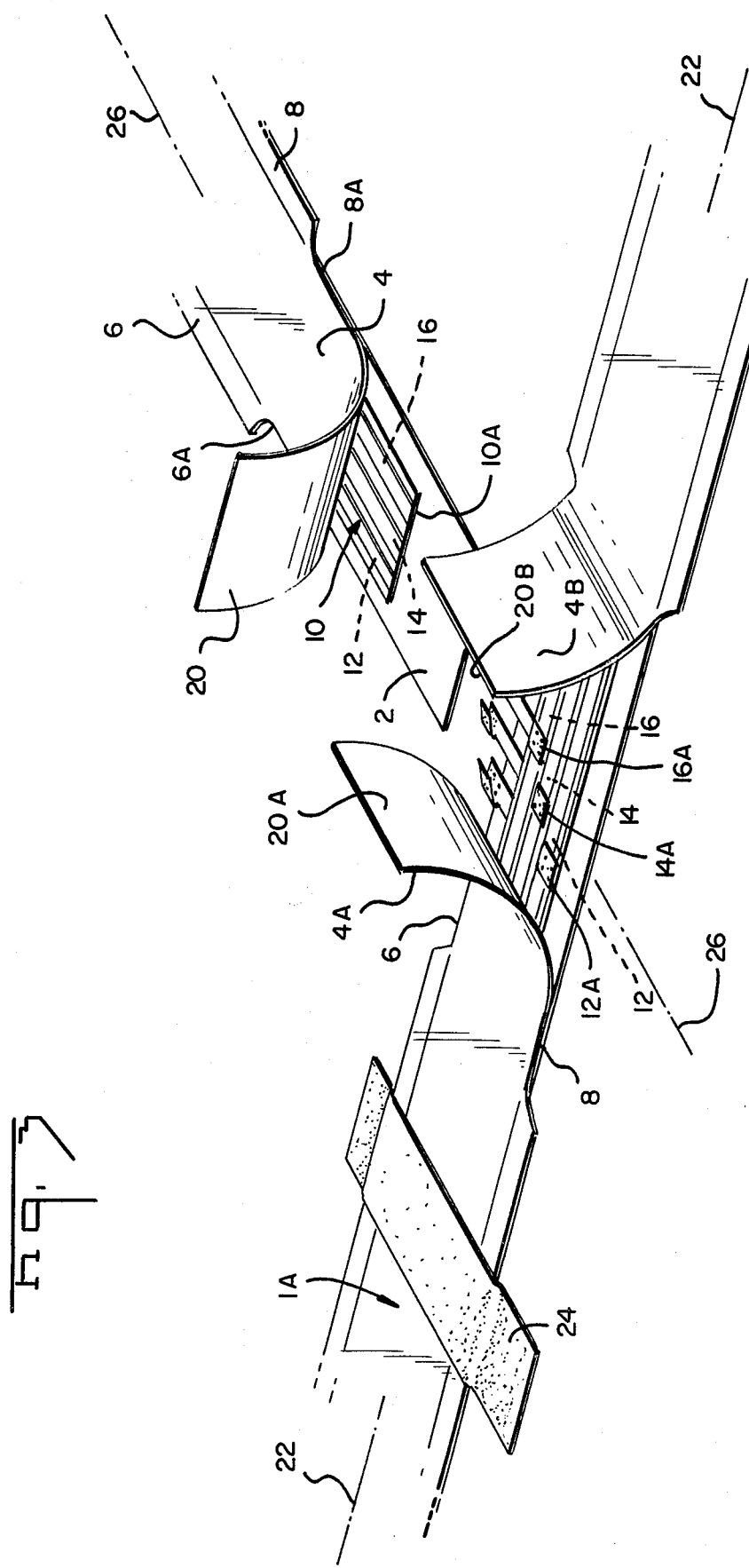

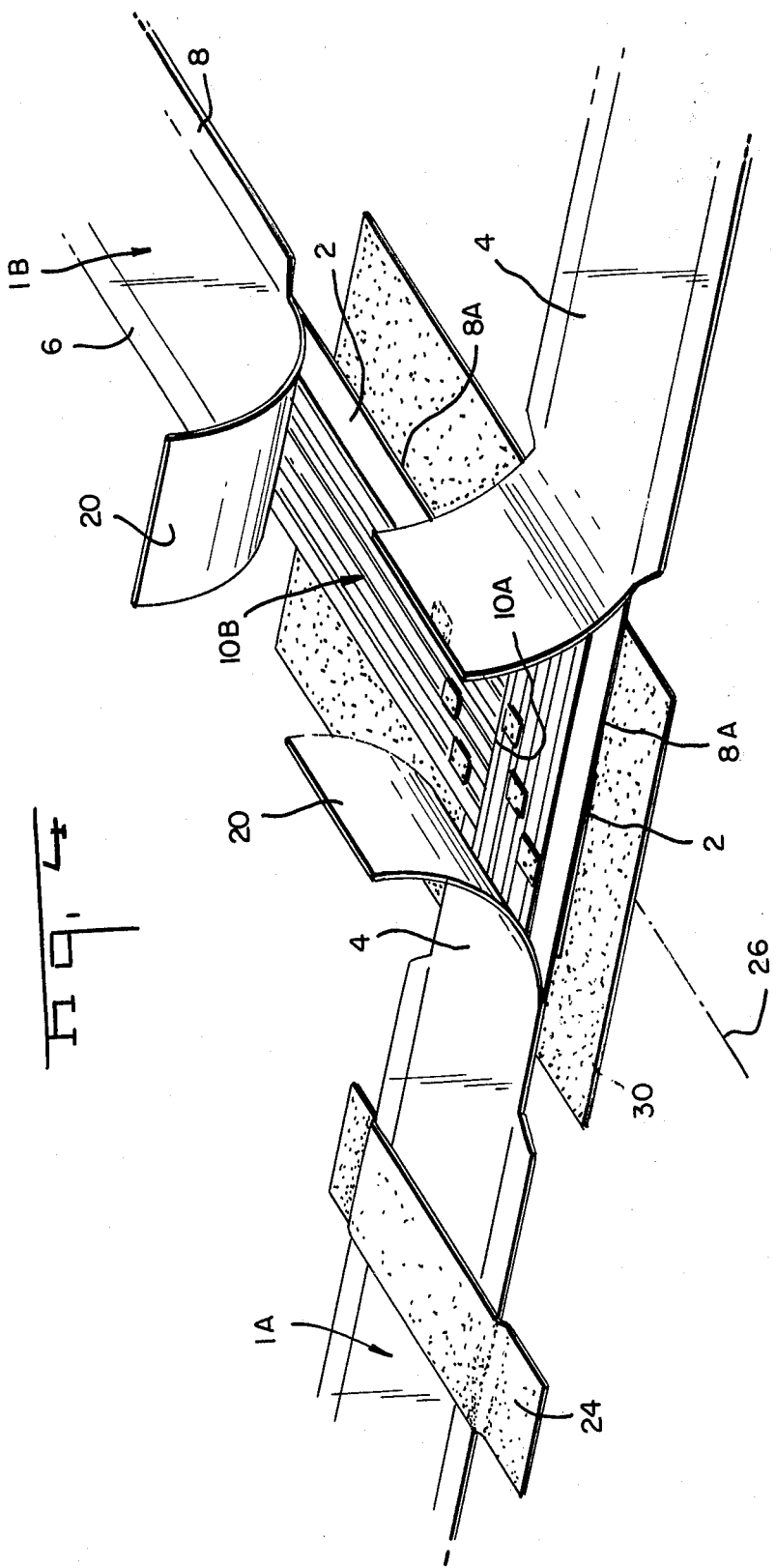

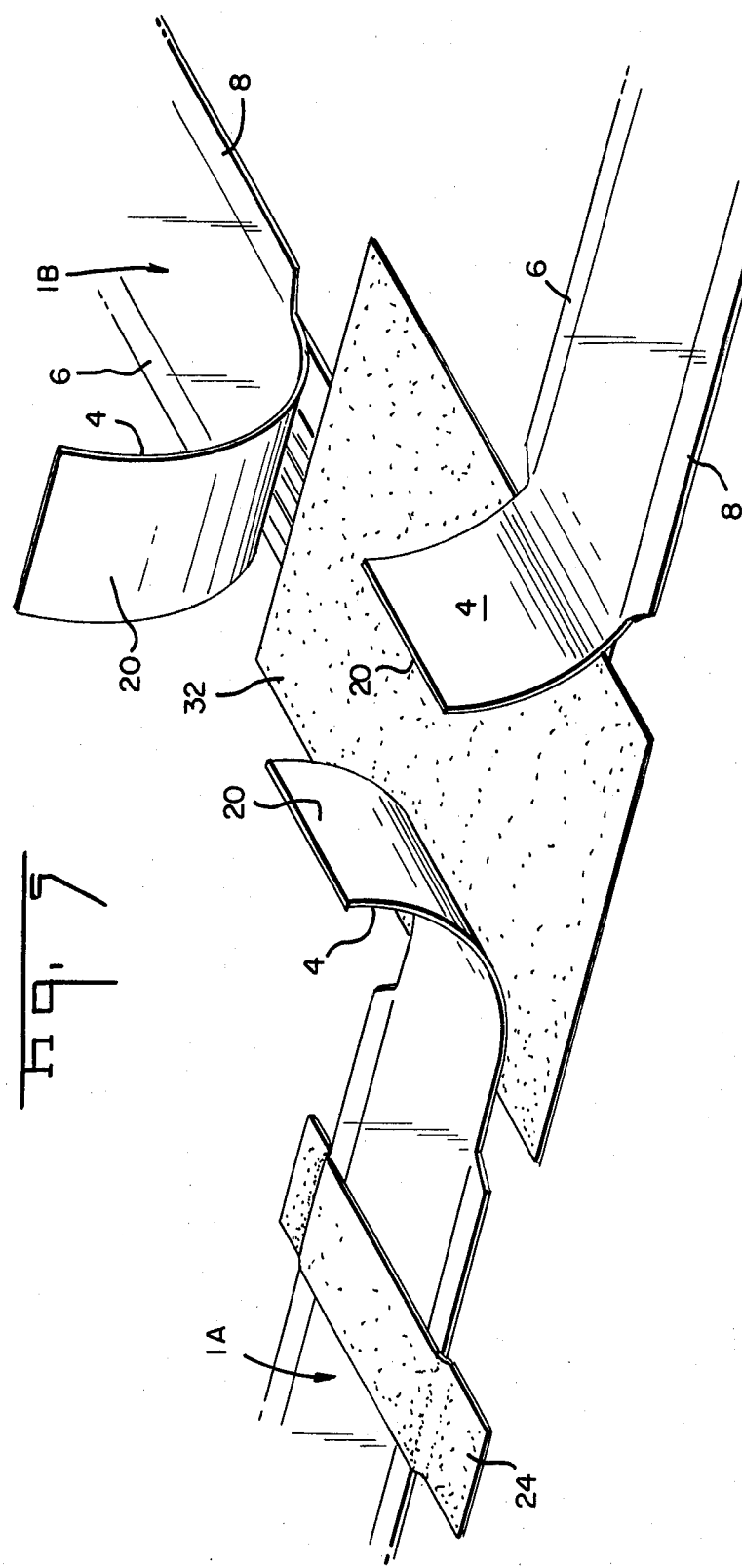

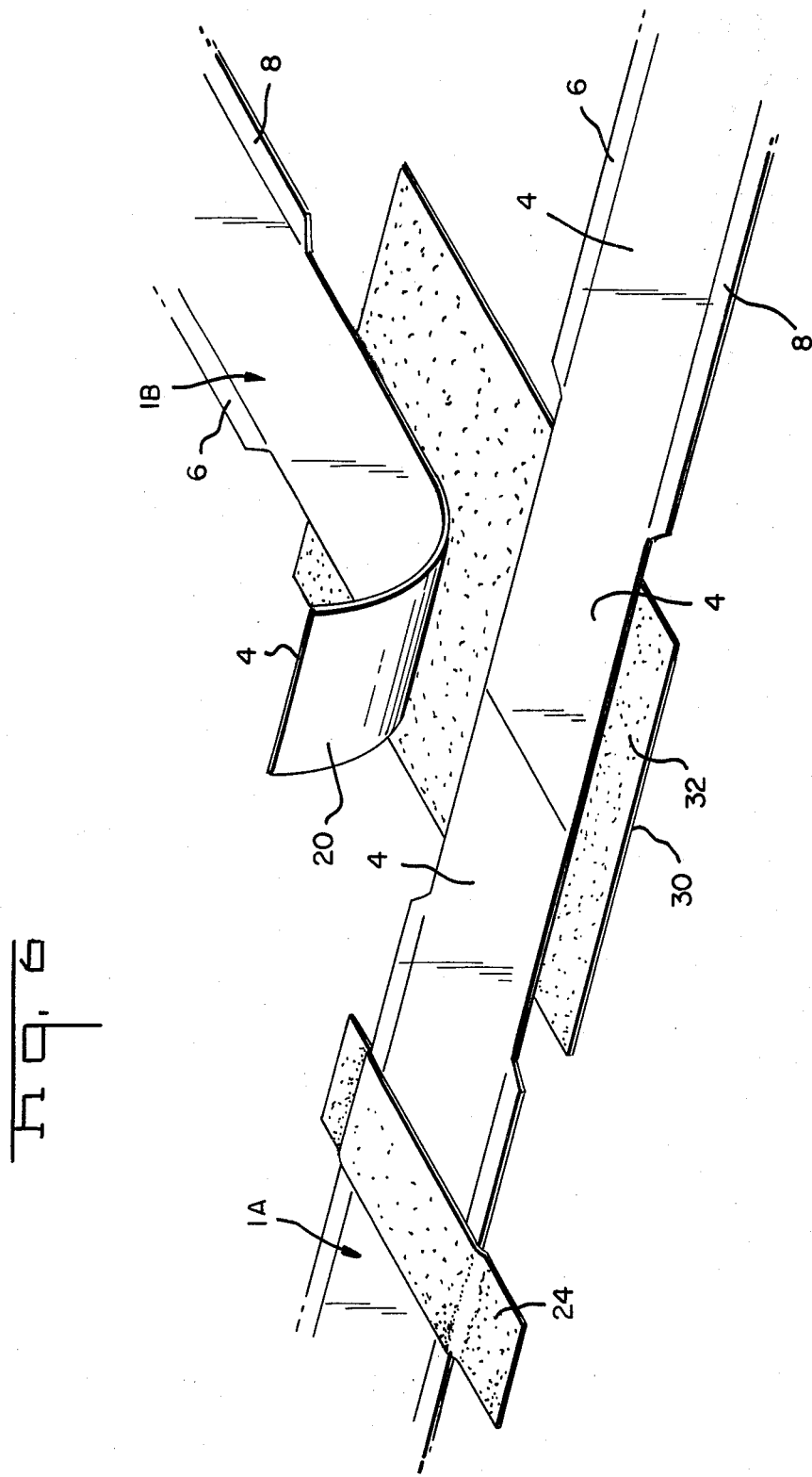

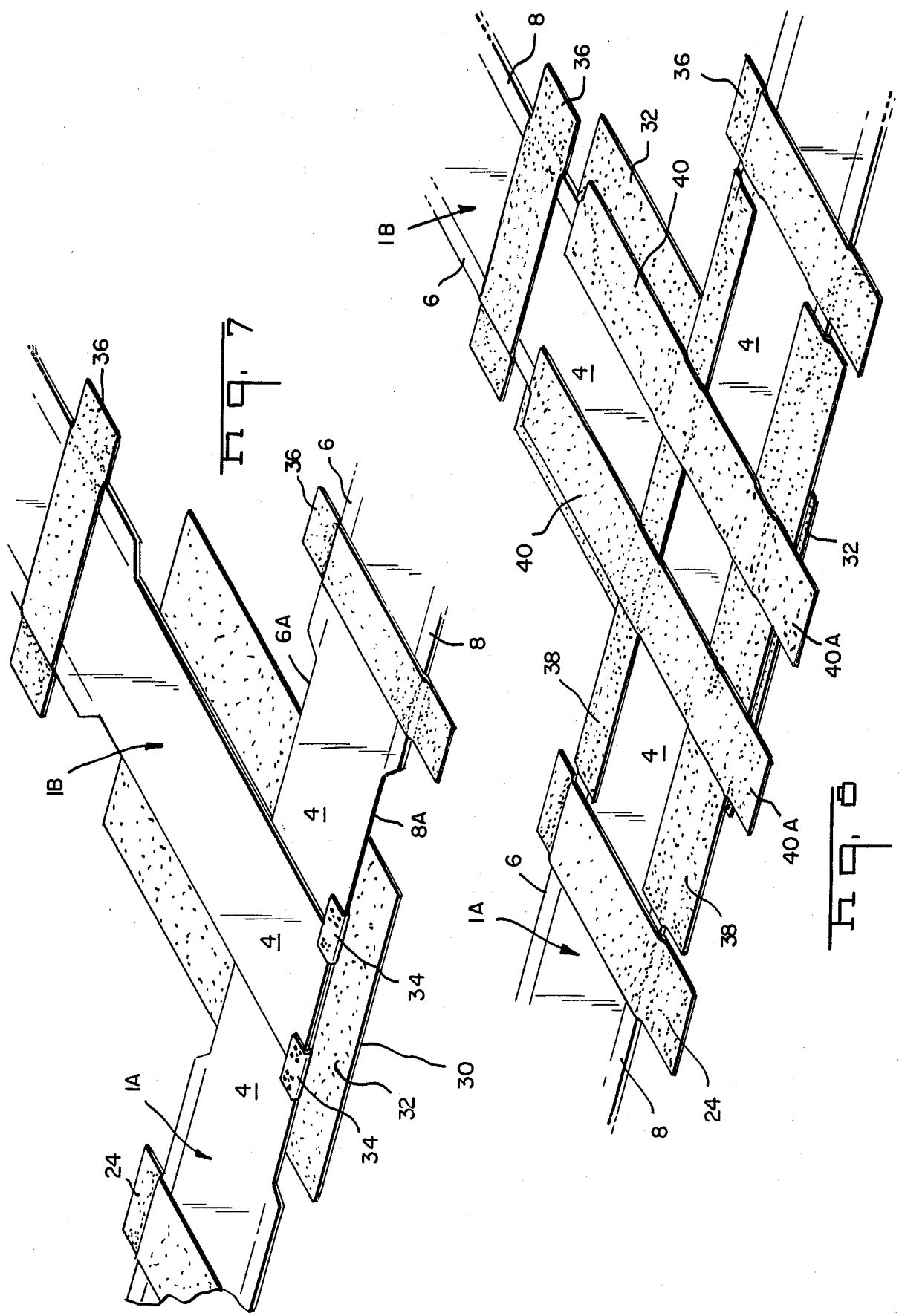

METHOD FOR SPLICING A FLAT CONDUCTOR CABLE ENCLOSED WITHIN A SEALED ENVELOPE

CROSS REFERENCE TO RELATED APPLICATION

This application is a continuation-in-part of Application, Ser. No. 06/228,644, filed Jan. 26, 1981, now U.S. Pat. No. 4,319,075.

FIELD OF THE INVENTION

The present invention relates to utilization of a flat conductor cable enclosed within a sealed envelope. In particular, methods are disclosed for entering the envelope to route the cable and to splice the cable to another, like cable. The structure of the cable assemblies also are disclosed.

BACKGROUND OF THE INVENTION

A commercial office is supplied with circuit wiring by a network of flat electrical cable routed over the office floor and covered by floor covering in the form of carpet squares. The cable requires a bottom shield layer of thin plastic, intended to protect the cable from damage by irregularities of the floor surface. The cable itself comprises 3 flexible, flat conductors in a plastic sheath. The cable is covered by a ribbon layer of cold rolled steel which protects the cable from foot traffic and furniture movement and placement. The layers are taped to the floor. The carpet squares are glued to the floor and over the metal shield.

In an improved undercarpet wiring installation, the cable and the metal shield are enclosed within a sealed, plastic film envelope which protects the cable from contaminate fluids and fluid borne residues. The envelope must be opened to gain access to the cable conductors. The present invention relates to a procedure for reclosing and sealing any openings made in the envelope pursuant to making various types of electrical connections to the cable conductors. Further the invention relates to a procedure for making a splice along the route of the cable, insuring that openings in the envelope are reclosed and sealed.

SUMMARY OF THE INVENTION

The present invention resides in the structure of, and the method for making, a splice of two intersecting flat cables each protected by an overlying metal shield top layer and an enclosing sealed envelope. According to the present invention, any openings in the envelope of each cable are reclosed and sealed. The invention resides further in the structure of, and method of assembling, an electrical interconnection of two flat cables contained within a reclosed and resealed envelope.

The cable to which the present invention pertains has an outer envelope sealed along its side margins. These side margins may be cut away, opening the envelope along the side margins to allow various layers of the cable to be lifted apart temporarily from one another. Thereafter, the metal shield and envelope layers are carefully severed, without severing the cable. The splice connection is fabricated. Then the shield and envelope layers are interleaved and relaid flatly to cover the bottom and top of the spliced cables. An insulation sheet also is interleaved to isolate the cable electrically from the shield layer. Tape is applied to the open edges of the envelope layers, sealing edges and securing the cable to the floor.

An object of the present invention is to provide a structure of, and a method for making, a flat splice in an undercarpet run of flat cable enclosed in a sealed envelope.

Another object is to provide a method for closing and resealing openings in an envelope which sealably encloses a flat cable.

Other objects and advantages of the present invention will become apparent by way of example from the following detailed description taken in conjunction with the drawings.

DESCRIPTION OF THE DRAWINGS

FIG. 1 is a perspective view of an undercarpet flat cable for circuit wiring being opened by a suitable knife type tool.

FIG. 2 is an enlarged cross section of the cable shown in FIG. 1, with the various layers of the cable separated for illustration purposes.

FIG. 3 is a perspective view of electrical terminals making tap connections to respective conductors of the cable shown in FIG. 2.

FIG. 4 is a perspective view of electrical terminals joining respective conductors of a first cable with respective conductors of a second cable to provide a splice connection.

FIG. 5 is a perspective view of a shield plate overlying the splice connection shown in FIG. 4.

FIG. 6 is a perspective view of the first and second cable assemblies with the various layers thereof interleaved.

FIG. 7 is a perspective view of the cable assemblies of FIG. 6 joined by ground terminal connections.

FIG. 8 is a perspective view of the joined cable assemblies of FIG. 7, sealed by adhesive backed tape.

DETAILED DESCRIPTION

FIGS. 1 and 2 illustrate an undercarpet cable assembly 1A and a second assembly 1B for use in circuit wiring. Each assembly is made up of several layers. The cable itself, is generally illustrated at 10, and comprises a flexible sheath of insulation 18 bonded to and encasing three flat flexible conductors 12, 14 and 16, each of cross section equivalent to American Wire Gauge (AWG) Number 12 copper wire, having a current carrying capacity of 20 amperes at 120 volts.

The cable 10 is overlaid with an elongated metal shield 20 comprising a flexible elongated ribbon layer of 10 mils thick, galvanized or electroplated zinc over cold rolled steel. The cable 10 and metal shield 20 are stacked together without bonding therebetween, and are encased by an elongated envelope comprising bottom and top layers 2, 4 of waterproof, flexible, nonconductive vinyl film ribbons, 10 mils thick. The side edge margins 6, 8 of the envelope layers 2, 4 overlap and are sealed together, either by adhesive or heat bonding. Layer 4 may be bonded to shield 20. For the purposes of illustration, FIG. 2 shows the various layers of the cable assembly separated. In practice they are stacked flatly against each other to provide a low height assembly. The assembly may be rolled up for storage as shown by the assembly 1B in FIG. 1.

The metal shield 20 provides physical damage protection and provides an electrical ground plane, commoned electrically to an external ground circuit for the cable 10. The envelope seals the cable from contact with fluids and fluid borne contaminants.

This cable assembly 1 is desired particularly for solving a problem present in prior, undercarpet cable installations. In prior installations, all the various layers of the cable were separate, and had to be routed separately over one another. Each layer was anchored to the floor with adhesive backed tape. If a sealed envelope was desired, additional layers of tape were applied continuously over the side edges of the layers. The cable assembly 1 has preassembled layers and saves installation time and materials.

FIG. 1 illustrates a first cable assembly 1 routed along a floor. The route is marked by a chalk line 22 which is covered by the cable centerline. Lengths of tape 24 are applied at intervals along the cable assembly 1 to tape the same to the floor. Suppose the cable assembly 1 is to splice to a second cable assembly having an intersecting run along another chalk line 26. Where first the cable assembly 1 crosses the chalk line 26, a razor knife 28 is used by a workman to sever through and cut away sections of the edge margins 6 and 8 of the layers 2 and 4, providing openings in the sealed margins along a limited length of the sealed envelope. The edges 6A and 8A of the openings are against and along the side edges of the shield 20.

FIG. 3 shows the assembly 1A with the layer 4 severed by a transverse cut which defines end sections 4A and 4B of the layer 4 on either side of the cut. The layer 20 of the assembly 1A also is severed by a transverse cut which defines end sections 20A and 20B of the layer 20 on either side of the cut. A workman will use a tool such as a pair of scissors or shears and simultaneously sever both layers 4 and 20 which intersect the side edges 6A and 8A, permitting the end sections 4A, 4B and the end sections 20A, 20B to be lifted and peeled back to expose the cable 10. FIG. 3 also shows the second assembly 1B routed along the floor. A workman provides openings along the sealed margins 6, 8, with these openings intersecting an end of the assembly 1B. The end 10A of the cable in assembly 1B is trimmed by a workman and recessed back from the ends of the layers 2, 4 and 20.

FIG. 4 shows the assembly 1B with the trimmed end 10A of the cable 10 laid by a workman in registration against the side edge of the insulation 18 of the cable 10 in the assembly 1A. The projecting end of the envelope bottom layer 2 is interleaved with and against the corresponding layer 2 of the assembly 1A. As shown in FIGS. 3 and 4, a folded flat electrical terminal of the type disclosed in U.S. Pat. No. 4,263,474, is applied by a workman and electrically splices the respective conductors 12 of the assemblies 1A and 1B. A terminal 14A similar to terminal 12A splices the conductors 14 of the respective assemblies 1A and 1B. A terminal 16A similar to terminal 12A splices the conductors 16 of the respective assemblies 1A and 1B. The terminals 12A, 14A and 16A penetrate through the insulation 18 of each cable 10 to establish electrical connection with the respective conductors 12, 14, 16. The assemblies 1A and 1B are spliced electrically by the terminals 12A, 14A and 16A. A workman then installs an impervious plastic sheet 30 under the spliced portions of the assemblies 1A, 1B.

FIG. 5 shows a second impervious plastic sheet 32, laid by a workman, over the spliced portions of the assemblies 1A, 1B.

Next, as shown in FIG. 6, the metal shield layers 20 of the respective assemblies 1A, 1B are interleaved, with the shield layer 20 of the assembly 1B overlying the end sections 20A and 20B of assembly 1A, and spanning across the cut through the layer 20 of the assembly 1A and providing a continuous shield layer. Simultaneously, the layers 4 of the assemblies 1A, 1B are interleaved with the layer 4 of assembly 1B overlying the end sections 4A and 4B of assembly 1A, and spanning across the cut to provide a long leakage path. Thereby, the layers 20 and the layers 4 bonded to the layers 20 are interleaved and overlapped and stacked flatly against one another.

As shown in FIG. 7, folded flat electrical terminals 34, of the type disclosed in U.S. Pat. No. 4,263,474 are applied by a workman to join overlapping portions of the shield layers 20 of assemblies 1A, 1B. The shield layers 20 are joined electrically together thereby. The terminals 34 also are folded over the overlapped layers 4 of assembly 1B and layers 4A, 4B of assembly 1A and thereby are clamped over the layers 20 which themselves are overlapped. The terminals 34 penetrate through the layers 4 and establish electrical connections with the layers 20. The metal shields 20 of the assemblies 1A, 1B thereby become electrically continuous and cover the spliced together portions of the cables 10. Additional flat lengths 36 of adhesive backed tape are applied transversely of the assemblies 1A and 1B securing the assemblies flatly to the floor.

As shown in FIG. 8, flat lengths 38 of adhesive backed tape are applied by a workman over the open side edges 6A and 8A of assembly 1A, simultaneously covering terminals 34, resealing the edges 6A and 8A, and adhering to the sheet 32 and the floor. Additional flat lengths 40 of adhesive backed tape are applied by a workman over the open side edges 6A and 8A of assembly 1B, resealing the assembly. Also the lengths 40 adhere to the sheet 32 and extend transversely across the assembly 1A and have end portions 40A adhered to the floor. Thereby each assembly 1A, 1B is resealed and secured to the sheet 32 and to the floor by the respective lengths 38, 40 of adhesive backed tape.

The present invention may be subject to many modifications and changes without departing from the spirit or essential characteristics thereof. The present embodiment is therefore intended in all respects as being illustrative and not restrictive of the scope of the invention.

I claim:

1. A method of constructing a sealed electrical splice, of a first and a second flat cable assembly in which each assembly includes a flat conductor cable and a metal shield layer within a sealed envelope having a top layer and a bottom layer, comprising the steps of:

providing openings into side margins of said top layer and said bottom layer of each said assembly, severing transversely a top layer of said first assembly and transversely said shield layer of said first assembly, in said second assembly trimming an end of said cable back from projecting ends of said shield layer and said top layer and said bottom layer, interleaving said bottom layers of said assemblies, electrically connecting said cables of said assemblies, covering said cables with a sheet of insulation material, interleaving said shield layers and said top layers of said assemblies, applying electrical terminals to said shield layers and said top layers, and sealing said openings in said top layers and said bottom layers with adhesive backed tape.

2. The method as recited in claim 1, and further including the step of: Securing said assemblies to a floor with adhesive backed tape.

3. The method as recited in claim 1, and further including the steps of: Stacking said interleaved shield layers flatly against said sheet, and stacking said interleaved top layers flatly against one another and against said interleaved shield layers.

4. The method as recited in claim 1, and further including the steps of: Stacking said shield layer of said second assembly flatly against said severed shield layer of said first assembly.

5. The method as recited in claim 1, and further including the steps of: Stacking said top layer of said second assembly flatly against said severed top layer of said first assembly.

6. A resealed electrical splice of a first and a second flat cable assembly routed along a floor, in which each assembly includes a flat conductor cable and a metal shield layer within a sealed envelope having a top layer and a bottom layer, characterized in that, side margins of each of the assemblies include openings therein, in the first assembly, the shield layer and the top layer are severed transversely, the cables of the assemblies are spliced by electrical terminals, the bottom layers of the assemblies are interleaved, the shield layers and the top layers of the assemblies are interleaved, electrical terminals connect the interleaved shield layers and the interleaved top layers, and flat lengths of adhesive backed tape reseal the openings in the envelope and secure the assemblies to the floor.

* * * * *